United States Patent Office 2,798,080
Patented July 2, 1957

2,798,080
PROCESS OF MANUFACTURING MIXED ANHYDRIDES OF CARBOXYLIC ACIDS

Edward U. Elam and Robert H. Hasek, Kingsport, Tenn., assignors to Eastman Kodak Company, Rochester, N. Y., a corporation of New Jersey No Drawing. Application May 10, 1956,
Serial No. 583,948

7 Claims. (Cl. 260—345.7)

This invention relates to a process of manufacturing mixed anhydrides of carboxylic acids, from ketene and heterocyclic esters of lower aliphatic acids of the acetic acid series, and to the hydrolysis of these anhydrides.

The reaction between ketene and the ester is carried out in the presence of an acid catalyst, and may be represented generically by the equation:

$$(CH_2)_m-O-CH-O-C-R + CH_2:C:O \longrightarrow$$
$$(CH_2)_m-O-CH-CH_2-C-O-C-R$$

in which R is a $-C_nH_{2n+1}$ group, $n$ being a whole number not greater than 3, and $m$ is a whole number greater than 2 and less than 5. The compounds which may be reacted with ketene according to our invention are 2-acetoxy-tetrahydropyran, 2-acetoxytetrahydrofuran, and the corresponding propionoxy and butyroxy compounds.

The temperature at which the reaction between ketene and the ester is conducted may vary between about —30° C. and about 150° C., but is preferably between about 20° C. and about 60° C., the actual temperature required depending both upon the nature of the acid catalyst used and upon the nature of the ester being reacted.

The catalyst used in this reaction may be any suitable acid catalyst such as sulfuric acid, phosphoric acid, benzene-sulfonic acid, zinc chloride, ferric chloride, aluminum chloride, boron trifluoride and its addition products with ethers, esters, and the like, Friedel-Crafts type catalysts, or a combination of these acid catalysts. The amount of catalyst used is not particularly critical, any may vary between wide limits, depending both upon the ester being reacted and the particular acid catalyst used. In general, concentrations between 0.01% and 10%, and particularly between 0.1% and 2.0%, are satisfactory.

The practice of this invention is illustrated but not limited by the following examples:

Example 1

Ketene was passed into a solution of 1 g. of anhydrous zinc chloride in 200 g. (1.4 moles) of tetrahydropyran-2-ol acetate until a total of 122 g. (2.9 moles, 100% excess) had been absorbed. The reactioen temperature was held below 25° C. by chilling the mixture in an ice bath during the reaction.

The reaction product was treated with 5 g. of potassium carbonate dissolved in 10 ml. of water and distilled to give, after removal of low-boilers, 68.6 g. (34.1% yield) of crude tetrahydropyran-2-acetic acid, B. P. 132° C. (8 mm.) to 140° C. (18 mm.). The crude acid, which crystallized slowly on standing, was pressed on a porous plate and recrystallized from benzene-light petroleum ether to give pure tetrahydropyran-2-acetic acid, M. P. 51–54° C.

*Analysis.*—Calcd. for $C_7H_{12}O_3$: C, 58.31; H, 8.39; neut. equiv., 144. Found: C, 58.09; H, 8.61; neut. equiv., 145.3.

The p-bromphenacyl ester of the acid melted at 109–111° C.

*Analysis.*—Calcd. for $C_{15}H_{17}BrO_4$: Br, 23.4. Found: Br, 23.02.

The reactions taking place in this example may be represented by the following equations:

$$\text{tetrahydropyran-2-ol acetate} + CH_2:C:O \longrightarrow$$

mixed anhydride of acetic and tetrahydropyran-2-acetic acids $$\xrightarrow{H_2O} \text{tetrahydropyran-2-acetic acid} + CH_3COOH$$

The tetrahydropyran-2-acetic acid was cleaved by the method described by Raymond Paul in Compt. rend. 208, 587–9 (1939), abstracted in Chemical Abstracts 33, 4192. The cleavage was carried out as follows:

A mixture of 57.1 g. of tetrahydropyran-2-acetic acid, 1 g. of zinc chloride, and 100 ml. of acetic anhydride was refluxed for three hours. The cooled product was made alkaline with 20% sodium hydroxide and filtered through a bed of "Filtercel" to remove tar. The filtrate was acidified with concentrated hydrochloric acid and extracted with ether. The extract was heated on the steam bath to remove low boilers; distillate from 168–178° C. (2 mm.), $n_D^{20}$ 1.4771, weighed 31.7 g.; from 178–230° C. ( 2 mm.), 7.3 g. The residue weighed 10 g.

*Analysis.*—Calcd. for $CH_3COO(CH_2)_4CH:CHCOOH$: neut. equiv., 186; hydrogen number, 186. Found: (168–178° C./2 mm. fraction); neut. equiv., 189; hydrogen number, 200.

The cleavage of the tetrahydropyran ring of tetrahydropyran-2-acetic acid may be represented by the following equation:

$$\text{tetrahydropyran-2-acetic acid} + (CH_3CO)_2O \longrightarrow$$

$$CH_3 \cdot \overset{O}{\overset{\|}{C}} \cdot O \cdot (CH_2)_4 \cdot CH:CH \cdot COOH + CH_3 \cdot COOH$$

The product (168–178° C./2 mm. fraction) was saponified and hydrogenated by conventional methods. A 2-g. sample of the hydrogenated material was refluxed overnight with 3 g. of hydrazine hydrate. The hydrazide, which separated on cooling, melted at 122–124° C. after two crystallizations from ethanol. The hydrazide of 7-hydroxyheptanoic acid is reported (Huisgen and Reinertshofer, Ann. 575, 213 (1951)) to melt at 124–124.5° C.

*Analysis.*—Calcd. for $C_7H_{16}N_2O_2$: N, 17.5. Found: N, 17.05; 16.88.

Tetrahydrofuran-2-acetic acid may be prepared by reacting ketene with 2-acetoxy-tetrahydrofuran and hydrolyzing, according to the equations:

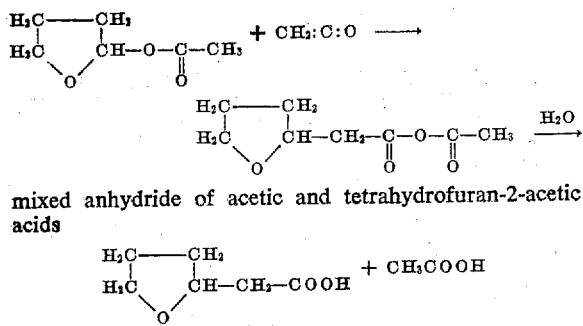

mixed anhydride of acetic and tetrahydrofuran-2-acetic acids

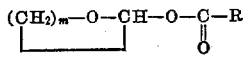

Example 2

The reaction was carried out as described in Example 1 with 285 g. (1.98 moles) of 2-acetoxytetrahydropyran, 3 g. of anhydrous zinc chloride, and 150 g. (3.56 moles) of ketene. The temperature in this experiment was held between —17° C. and —30° C. until all of the ketene had been absorbed and the mixture removed from the cold bath. As soon as cooling was removed, the temperature of the mixture rose rapidly to the boiling point and the product turned black. It was stirred for several hours with 50 ml. of water and distilled to give 53.6 g. (18.6% yield) of crude tetrahydropyran-2-acetic acid.

Cleavage, hydrogenation, and hydrolysis of tetrahydrofuran-2-acetic acid, by methods analogous to that described for tetrahydropyran-2-acetic acid, lead to 6-hydroxyhexanoic acid.

Valuable fibers, plastics, polymeric plasticizers, and synthetic lubricants may be made from 6-hydroxyhexanoic acid and 7-hydroxyheptanoic acid by procedures well known to those skilled in the art. P. J. Flory (Chemical Reviews, vol. 39, pp. 137–197 (1946)) disclosed that hydroxy acids of the formula $HO(CH_2)_nCO'H$, where $n$ is 5 or more, can be polymerized to fiber-forming products of high molecular weight. Van Natta, Hill and Carothers (Journal of the American Chemical Society, vol. 56, p. 455 (1934)) disclosed the preparation and properties of polyesters from 6-hydroxyhexanoic acid. Hill reviewed the state of the art in "Fibers from Synthetic Polymers" (Elsevier Publishing Company, New York, 1953).

It is well known to the art that hydroxy acids can be converted by treatment with hydrogen bromide to bromo acids, which, when treated with ammonia, yield amino acids. 6-aminohexanoic acid can be converted to a polyamide now known as "Perlon" or "nylon 6." The properties of the polyamide from 7-aminoheptanoic acid are superior to those of the present commercial "nylon 6," but up to now, no economically feasible synthesis for the intermediate amino acid has been found.

What we claim as our invention and desire to be secured by Letters Patent of the United States is:

1. A process of manufacturing a mixed anhydride of two carboxylic acids, which comprises reacting ketene, in the presence of an acid catalyst, with an ester which has the formula $$(CH_2)_m\text{—}O\text{—}CH\text{—}O\text{—}\underset{\underset{O}{\|}}{C}\text{—}R$$

in which R is a $-C_nH_{2n+1}$ group, $n$ being a whole number not greater than 3, and $m$ is a whole number greater than 2 and less than 5.

2. A process of manufacturing the mixed anhydride of acetic and tetrahydropyran-2-acetic acids, which comprises reacting ketene, in the presence of an acid catalyst, with tetrahydropyran-2-ol acetate.

3. A process of manufacturing the mixed anhydride of acetic and tetrahydrofuran-2-acetic acids, which comprises reacting ketene with tetrahydrofuran-2-ol acetate in the presence of an acid catalyst 4. A process according to claim 1, in which the acid catalyst is anhydrous zinc chloride.

5. A process of manufacturing the mixed anhydride of acetic and tetrahydropyran-2-acetic acids, which comprises reacting ketene with tetrahydropyran-2-ol acetate in the presence of anhydrous zinc chloride.

6. A process of manufacturing tetrahydropyran-2-acetic acid, which comprises reacting ketene with tetrahydropyran-2-ol acetate in the presence of an acid catalyst to give the mixed anhydride of acetic and tetrahydropyran-2-acetic acids, and hydrolyzing the anhydride formed.

7. A process of manufacturing 7-hydroxyheptanoic acid which comprises reacting ketene with tetrahydropyran-2-ol acetate in the presence of an acid catalyst to give the mixed anhydride of acetic and tetrahydropyran-2-acetic acids, hydrolyzing the mixed anhydride to give tetrahydropyran-2-acetic acid, cleaving the tetrahydropyran-2-acetic acid by means of acetic anhydride to give the acetate of 7-hydroxy-2-heptenoic acid, and hydrolyzing and hydrogenating the acetate of 7-hydroxy-2-heptenoic acid to give 7-hydroxyheptanoic acid.

No references cited.

UNITED STATES PATENT OFFICE

CERTIFICATE OF CORRECTION

Patent No. 2,798,080                                               July 2, 1957

Edward U. Elam et al.

It is hereby certified that error appears in the printed specification of the above numbered patent requiring correction and that the said Letters Patent should read as corrected below.

Column 1, line 61, Example 1, for "reactioen" read -- reaction --; column 3, line 37, Example 2, for "$HO(CH_2)_nCO'H$" read -- $HO(CH_2)_nCO_2H$ --.

Signed and sealed this 1st day of October 1957.

(SEAL)
Attest:

KARL H. AXLINE                                             ROBERT C. WATSON
Attesting Officer                                         Commissioner of Patents